W. J. RIDER.
ADVERTISING APPARATUS.
APPLICATION FILED DEC. 20, 1906.
943,893.
Patented Dec. 21, 1909.
3 SHEETS—SHEET 1.
Fig. 1
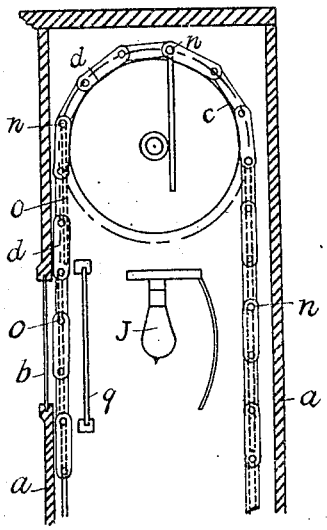
Fig. 5.
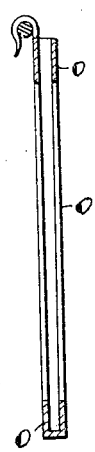
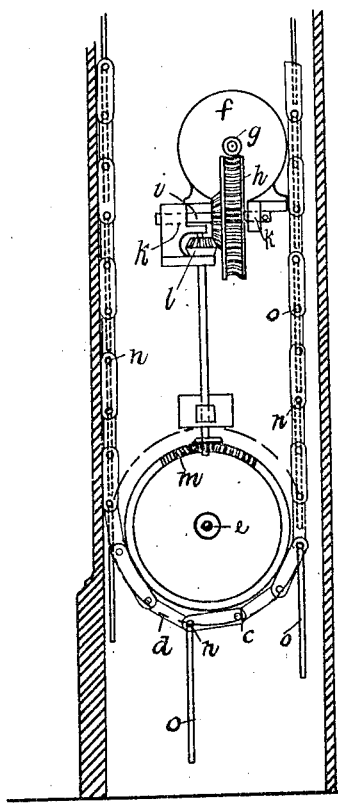
WITNESSES
INVENTOR
William J. Rider

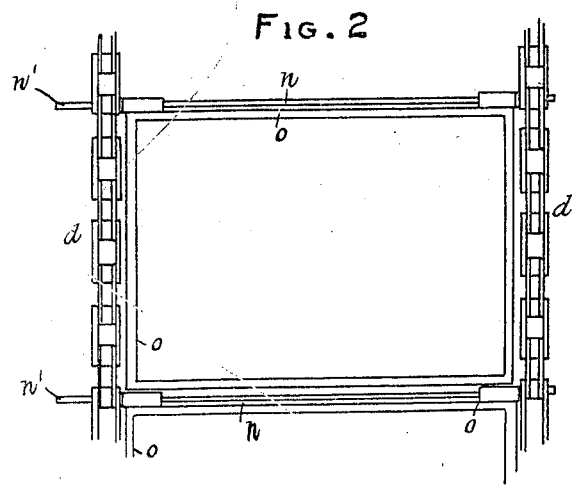
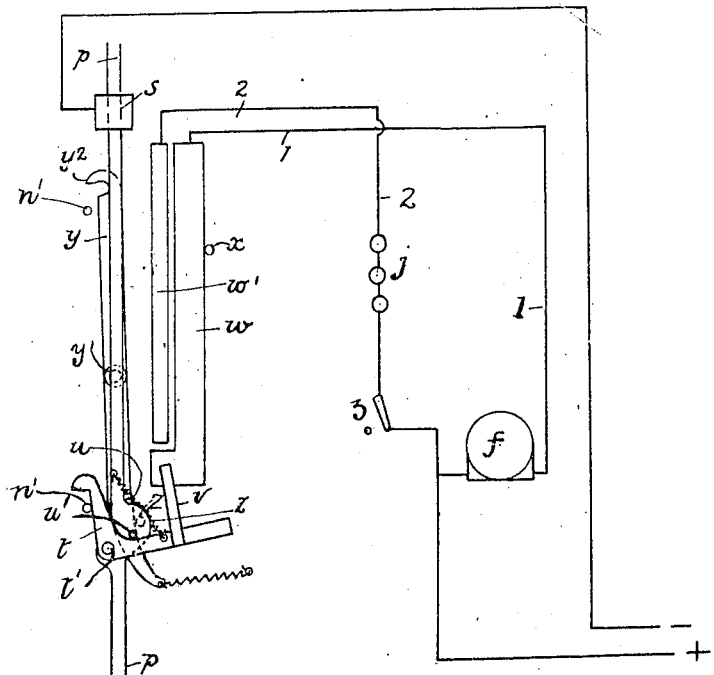

W. J. RIDER.
ADVERTISING APPARATUS.
APPLICATION FILED DEC. 20, 1906.
943,893.
Patented Dec. 21, 1909.
3 SHEETS—SHEET 3.
Fig. 4.
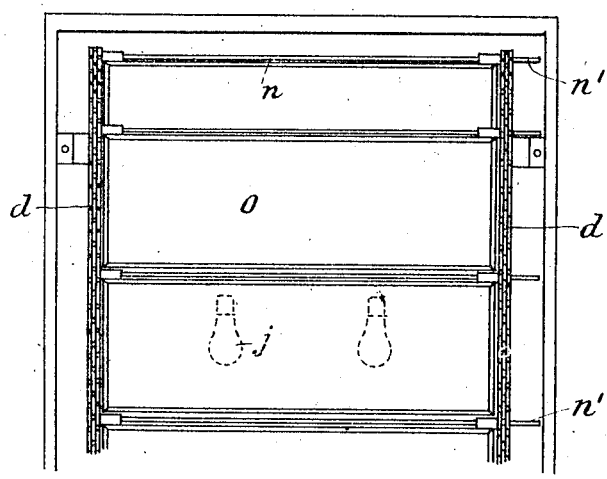
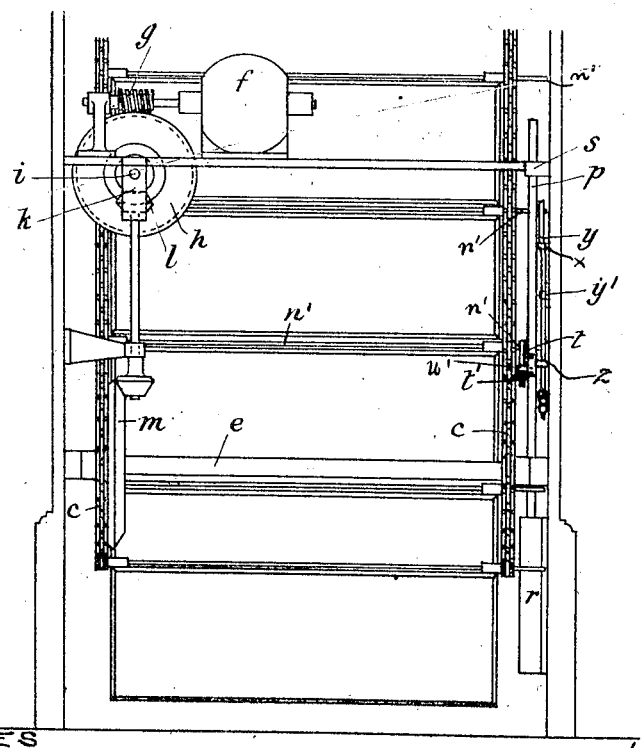
WITNESSES
INVENTOR
WILLIAM JOSEPH RIDER.

UNITED STATES PATENT OFFICE.

WILLIAM J. RIDER, OF WIMBLEDON, ENGLAND.

ADVERTISING APPARATUS.

943,892.

Specification of Letters Patent.   Patented Dec. 21, 1909.

Application filed December 20, 1906. Serial No. 348,711.

*To all whom it may concern:*

Be it known that I, WILLIAM JOSEPH RIDER, a subject of the King of Great Britain, residing at Bexley House, Queen's Road, Wimbledon, in the county of Surrey, England, have invented a certain new and useful Improved Advertising Apparatus, of which the following is a specification.

My invention relates to that description of advertising apparatus of which the advertisements are successively and intermittently exposed to view within the glazed opening of a suitable case or cabinet, and my invention has for its object to effect improvements in apparatus of this type.

According to my invention, I mount in a suitable case or cabinet a pair of endless chains upon sprocket wheels which are fixed in pairs upon their respective axles, means being provided for tensioning purposes. The chains are arranged at a suitable distance apart and are connected by rods which are fixed at their ends in the links of the chain, upon which rods I suspend frames, clips, or the like, to support transparent designs, advertisements, preferably produced by photographic processes as positives. Immediately behind the front line of transparencies and opposite the glazed opening of the case or cabinet I fix a piece of white opal glass, ground glass or other suitable material, which may serve a double purpose of reflecting light through the transparencies in daylight and of dispersing or diffusing the light from the gas, electric, or other lamp placed behind said opal or other plate. A suitable spring, electric, water or other motor is mounted within the cabinet and suitable gearing is provided to drive the mechanism intermittently, giving a stationary period to the mechanism when the transparencies are opposite the glazed openings.

In the accompanying drawings, Figure 1 is a vertical section of an apparatus with electric driving and lighting arrangements. Fig. 2 is a detail view illustrating the chain of pictures; Fig. 3 is a detail view illustrating the mechanism for controlling the motion of the chain and automatically switching into the circuit the motor and lamps alternately. Fig. 4 shows a front view with the front of the casing removed. Fig. 5 is a detailed view showing the manner of suspending the frames *o*.

*a* is a case, *b* is a glazed opening, *c, c* are sprocket wheels, and *d, d* are the chains. The upper sprocket wheels are each mounted upon respective short axles, while the lower sprocket wheels are fixed to a shaft *e* carried in suitable bearings. Any suitable gearing or mechanism may be employed for intermittently rotating the shaft *e*. That shown consists of an electric motor *f* which drives, through a worm *g*, a worm-wheel *h* fixed to a shaft *i* carried in bearings *k;* bevel or miter gearing *i* transmit the rotary motion to a bevel wheel *m* fixed to the shaft *e*.

Referring now to Fig. 2, *d, d* are the endless chains which are connected together at suitable intervals by rods *n* upon which the frames *o* for the transparent (or opaque) pictures or advertisements are hung; the frames *o* may be fixed to the rods *n* or they may be detachably connected thereto, as shown in Fig. 5.

The intermittent motor of the chain of pictures or advertisements is, in the apparatus illustrated, effected by the mechanism illustrated in Figs. 3 and 4. *n', n'* indicates extended ends of the rods *n* (seen also in Fig. 2), and *p* is a rod the lower end of which is fitted with a piston working in a suitable dashpot *r* and the upper end of which is supported with a bracket bearing *s*, the rod *p* being suitably weighted to automatically fall, the speed of descent of which is governed by the dashpot. The rod *p* carries a lifting catch lever *t* pivoted at *t'* and held by a spring *u* normally against a stop *u'*. The tail of the lever *t* carries a spring contact *v* which is capable of making contact with either plate *w* or *w'* according to the position of the lever *t*. The plate *w* is in the motor circuit 1 and the plate *w'* is in the lamp circuit 2. In the position shown in Fig. 3, the motor circuit 1 is closed and the chain is just about to move upward. The end *n'* of one of the rods *n* then engages the catch of the lever *t* and rotates the latter sufficiently to bring the spring contact *v* in line with the plate *w* when the continued movement of the chain carries with it the rod *p* and lever *t* in electric contact with the plate *w* and the bearing *s*. When the rod has reached a certain height, the tail of the lever *t* comes into contact with a stop *x*, which trips the catch lever and disengages it from the end *n'* of the pin *n;* the rod then commences to descend slowly whereupon the lever *t* returns to its normal position, breaking contact with *w* and making contact with the plate *w'* and thereby completing the lamp circuit. Simultaneously the motor circuit is broken and the motion of the chain arrested by a spring controlled stop lever *y* pivoted at *y'* to the case, the end of which stop lever has a hook $y^2$ to engage the pin *n'*. Thus during the changing of the picture at the opening *b*, the lamps are not in the circuit, and during the stationary period of the picture at the opening of the motor is not in the circuit. As the rod *p* descends, a pin *z* thereon (Fig. 4) comes in contact with the lower part of the stop lever *y* and disengages the hook $y^2$ from the pin *n'* and at about the same moment the contact *v* leaves the plate *w'* and passes on to the lateral extension of the plate *w*, again starting the motor.

The pictures of advertisements may be transparent or opaque. if the former, light from the lamp *j* is diffused through an opal glass *q* which also serves as a reflector for daylight during the day time, the lamp circuit being broken by moving the switch 3.

I claim:—

1. An advertising device comprising a case, sprocket wheels therein, chains on said wheels, advertising cards carried by said chains, electric lamps for illuminating said cards, an electric motor for driving the sprocket wheels, an automatic switch device alternately placing the motor and the lamps in circuit and means for operating the switch from the chains.

2. In advertising apparatus of the type set forth, an intermittent driving mechanism comprising an electric motor, sprocket wheels and chains actuated thereby, projecting pins on said chains, a rod mounted to slide in bearings connected with one pole of a source of electricity, a catch lever pivoted on said rod and adapted to engage said projecting pins, an electrical contact piece on said catch lever, a contact plate with which said contact piece is adapted to engage, said plate being connected with the other pole of the source of electricity through the motor, automatic disengaging means for said catch lever, and means governing the speed of descent of said rod, as set forth.

3. In advertising apparatus of the type set forth, an intermittent driving mechanism, comprising an electric motor, sprocket wheels and chains actuated thereby, projecting pins on said chains, a rod mounted to slide in bearings connected with one pole of a source of electricity, a catch lever pivoted on said rod and adapted to engage said projecting pins, an electrical contact piece on said catch lever, a contact plate with which said contact piece is adapted to engage, said plate being connected with the other pole of the source of electricity through the motor, automatic disengaging means for said catch lever, means governing the speed of descent of said rod, a stop lever arresting the motion of the chain and automatic disengaging means for said stop lever, as set forth.

4. In advertising apparatus of the type set forth, an intermittent driving mechanism comprising an electric motor, sprocket wheels and chains actuated by said motor, projecting pins on said chains, a rod mounted to slide in bearings connected with one pole of a source of electricity, a catch lever pivoted on said rod and adapted to engage said projecting pins, an electric contact piece on said catch lever, a contact plate with which said contact piece is adapted to contact, said plate being connected with the other pole of the source of electricity and through the motor and lamp circuit, automatic disengaging means for said catch lever, means governing the speed of descent of said rod, a stop lever arresting the motion of the chain, automatic disengaging means for said stop lever, an electric illuminating device, and a contact plate with which said contact piece is adapted to engage, said plate being connected in the lamp circuit, as set forth.

In testimony whereof, I have hereunto set my hand in the presence of two subscribing witnesses.

WILLIAM J. RIDER.

Witnesses:
J. P. CRAWLEY,
W. J. SKERTEN.